United States Patent [19]

Burns

[11] 3,760,101

[45] Sept. 18, 1973

[54] COIN TELEPHONE CIRCUIT

[75] Inventor: Robert Vincent Burns, Tinley Park, Ill.

[73] Assignee: GTE Automatic Electric Laboratories Incorporated, Northlake, Ill.

[22] Filed: Jan. 24, 1972

[21] Appl. No.: 220,000

[52] U.S. Cl. .......... 179/6.3 R

[51] Int. Cl. .......... H04m 17/02

[58] Field of Search .......... 179/6.3 R, 6.5, 6.4; 178/2 F; 194/9, 10

[56] References Cited

UNITED STATES PATENTS

| | | | |
|---|---|---|---|
| 3,169,167 | 2/1965 | Goodale et al. | 179/6.3 R |
| 3,239,609 | 3/1966 | Andregg et al. | 179/6.3 R |
| 3,579,253 | 5/1971 | Edington | 179/6.3 R |
| 3,565,227 | 2/1971 | Flevaris | 194/9 R |
| 3,478,855 | 10/1969 | Seversen | 194/9 R |

*Primary Examiner*—Kathleen H. Claffy
*Assistant Examiner*—Kenneth D. Baugh
*Attorney*—K. Mullerheim et al.

[57] ABSTRACT

A coin telephone circuit operable by minor strapping changes in the prepay, semi-postpay and emergency service modes of operation. Included is an electronic totalizer which permits the phone to be programmed for any initial deposit rate required. Audio frequency signals are applied to the telephone line, corresponding to the value of the coins deposited and in prepay service provides an indication to the central office that the proper rate has or has not been deposited.

16 Claims, 1 Drawing Figure

PATENTED SEP 18 1973 3,760,101
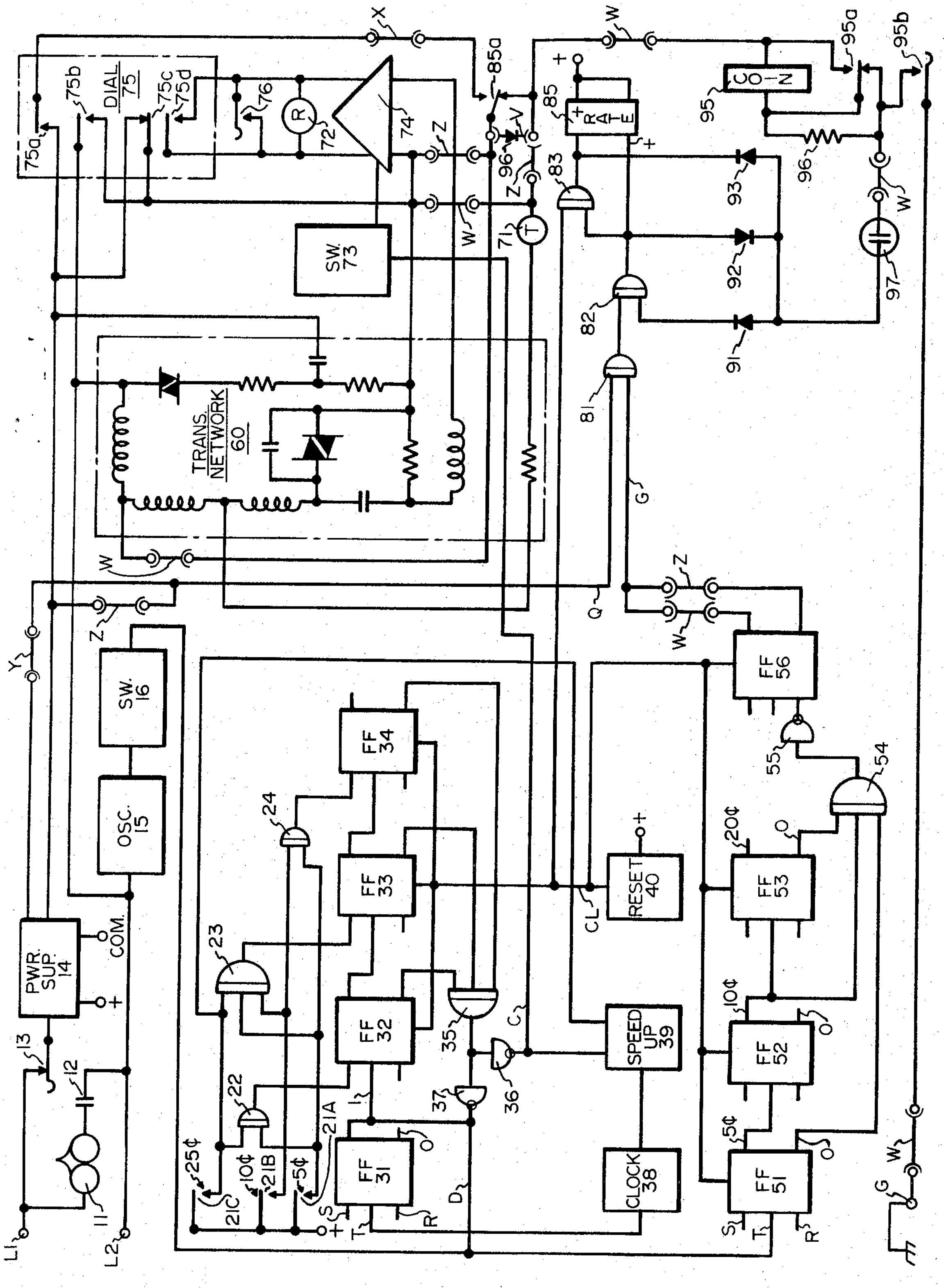

COIN TELEPHONE CIRCUIT

BACKGROUND OF THE INVENTION

1. Field of the Invention

This invention relates to a coin telephone circuit and more particularly to a coin telephone usable in regular prepay, semi-postpay and emergency calling applications.

2. Description of the Prior Art

Most of the coin telephones now in operation throughout the country are descendants of a design first introduced in 1912 by the originator of public telephones, The Grey Telephone Pay Station Company. During its evolution the coin telephone has seen incorporation of such features as dial operation, anti-side tone transmission circuits, one-piece handset, conversion from 5 cents to 10 cents service, self-compensating transmission networks, printed wiring transmission networks, single coil prepay coil relays and touch calling operations.

Among the more recent modifications of coil telephone design have been the inclusion of electronic coin responsive signaling apparatus for informing the operator of the number and denomination of coins deposited by the subscriber. A unit such as this which replaces the conventional bell and gong arrangement, is shown in U.S. Pat. No. 2,729,703 issued in Jan. 1956 to A. H. Faulkner et al. Another important addition has been the inclusion of totalizer mechanisms which operate in response to the deposit of coins to store coin deposit information during operation. Most embodiments of this device to date have been electromechanical in nature and are typified by that disclosed in U.S. Pat. No. 3,435,146 issued to E. R. Andregg and K. F. Voyles.

Another recent modification of coin telephone circuitry has permitted coin free access to an operator or to a preselected number from a paystation telephone to make limited telephone service available particularly under emergency conditions when the calling party may not have the required coins available for making the minimum deposit conventionally required. Obviously providing this type of service in semi-postpay operational areas is of little or no difficulty. However, the bulk of modern coin telephones installed are operated in a prepay manner, where before dialing may commence a minimum coin deposit must be made. A coin free access system is shown in U.S. Pat. No. 3,406,256 to L. A. Strommen and U.S. Pat. No. 3,579,253 to J. E. Edington.

Accordingly it is the object of the present invention to provide a coin telephone circuit that is usable to provide for either prepay, semi-postpay and emergency calling applications as well as incorporate electronic circuitry with the attendant advantages of reduced size and economy for a programmable totalizer and for coin annunciator circuitry that provides discernible tones to a telephone central office to indicate the denomination of coins that have been dropped in the pay station.

SUMMARY OF THE INVENTION

The present invention is a coin telephone circit designed to incorporate simultaneously a large number of improvements that have been developed for public telephone service in recent years. This telephone is capable of providing service for regular prepay, semi-postpay and emergency calling applications as well as containing an electronic totalizer which permits the phone to be programmed for any initial deposit rate required.

Change from one mode of operation to another is accomplished by connection or disconnection of certain straps within the telephone itself. Provisions for future requirements of higher initial calling rates are included in the present circuitry as well as facilities for generating of tones for use in identifying deposited coins, so accurately that they may be recognized by a machine circuitry at the telephone central office.

The most important portion of the improved circuitry of the present coin telephone is the inclusion of an electronic totalizer that provides the following functions: The totalizer prevents the completion of a call until the required amount of money up to a predetermined base rate has been deposited, except when the unit is strapped to provide calls for the emergency calling feature. Restrapping permits selection of any base rate desired in 5 cents increments. Tone signals are generated by the unit to indicate to an operator at the central office the denomination of coins deposited. The totalizer controls the coin relay located within the telephone. The totalizer may be used with regular rotary dials or touch calling units. Power for operating the totalizer is derived from the telephone line and no adjustments are required other than adjustment of the coin tone oscillator frequency. As indicated previously movable straps permit operation in prepay, semi-postpay and emergency calling modes. A one way amplifier is included in the receiver circuit to prevent the receiver from being used as a transmitter in semi-postpay service.

BRIEF DESCRIPTION OF THE DRAWINGS

The single sheet of drawings appended hereto is a functional diagram of a coin telephone circuit as embodied in the present invention.

DESCRIPTION OF THE PREFERRED EMBODIMENT

Referring now to FIG. 1 the bulk of the included circuitry of the present coin telephone is associated with the electronic totalizer. The totalizer provides control of the signaling and transmission circuitry of the coin telephone and provides indications to the central office and to an operator of coins deposited within the coin phone. It is the flexibility of the totalizer that permits the present telephone to be arranged for prepay, semi-postpay and emergency calling services as well as with either rotary or touch calling dials.

The totalizer consists of three principal circuit sections, the first being a coin pulse generator that includes flip-flop circuits 31–34 inclusive, logic gates 22–24 and 35–37 inclusive as well as clock circuit 38 and speedup circuit 39. The coin pulse generator provides DC pulses corresponding to the denominations of the coins being deposited in response to operation of the 5, 10 and 25 cent coin switches included in the telephone (21A, 21B and 21C respectively). Another portion of the totalizer is the rate register which includes flipflop circuits 51, 52, 53 and 56 and associated logic gates 54 and 55. The rate register counts and stores the pulses from the coin pulse generator and controls the rate relay 85. The remaining totalizer circuitry includes a coin signal generator 15 which generates audio tones and associated switch 16 which controls the operation of oscillator 15, also included is the rate relay 85 and associated logic circuitry consisting of gates 81, 82 and 83. Other additional portions of the totalizer circuit include an amplifier 74 used in amplifying voice signals for receiver 72 and an associated switch 73 for controlling amplifier 74.

A power supply 14 is connected to the telephone line and provides a source of DC potential derived from central office battery for the electronic circuitry of the present coin telephone.

Also included in the present coin telephone circuitry in addition to the totalizer circuitry described above are a ringer and associated capacitor 11 and 12 which are connected across the line terminals L1 and L2, a dial 75, transmitter 71, receiver 72, associated transmission network 60 and coin relay 95. Among the various strappings included for the several modes of operation indicated above are the inclusion of "W" straps and "X" straps which in combination provide for regular prepay operation. Utilization of "W" straps in combination with the "Y" strap permits emergency calling and the utilization of "Z" strapping only provides for the semi-postpay mode of operation.

Hookswitch contacts 13 and 76 are also included and are shown in their operated or off-hook position.

The primary job of the totalizer is to count and store the total value of coins deposited. It also performs several other functions. As coins are received the totalizer simultaneously mutes the coin telephone receiver and applies audio frequency signals to the line corresponding to the value of the coin deposited. In operator assisted calls these tones indicate the value of each coin deposited. The totalizer also controls the coin telephone by restricting either signaling or transmission until the initial rate has been deposited. The initial rate is normally set at 10 cents but can be easily revised for any value from 5 to 35 cents in 5 cent increments by changing the wiring associated with the outputs of flipflops 51, 52 and 53 which are included in the rate register circuitry.

As noted previously the totalizer includes a coin pulse generator, a rate register and interface circuitry between the totalizer and the remaining telephone circuit. When a deposit is made signals from the coin triggers 21A, 21B and 21C which represents the 5, 10 and 25 cent triggers respectively are fed into the coin pulse generator where pulses of the proper numbers and duration are produced corresponding to value of the coin deposited. These pulses are sent simultaneously to the rate register and the interface circuit. The rate register stores pulses generated by the coin pulse generator while the interface circuit converts the pulses to tone signals and applies them to the telephone line. A continuous output is also sent from the coin pulse generator to the interface circuit during the entire pulsing period to mute the receiver. This minimizes the level of coin tones reaching the user's ear and also reduces the possibility of fradulent usage of these tones. When the total number of pulses stored in the rate register equals the initial rate for which it is set, the rate register signals the interface circuit. The interface circuit responds to this signal to make the telephone operative. The interface circuitry serves to make the logic section of the totalizer, that is the coin pulse generator and rate register, compatible with the conventional telephone circuit.

Included as noted previously in the interface circuit is a regulated power supply 14 operated from line potential to power all other totalizer circuits. An audio oscillator 15 which the coin pulse generator keys through switch 16 as each coin is deposited a receiver muting control including switch 73 which is activated during the sending of tones; a unity gain one-way amplifier 74 used to isolate the receiver to prevent its use as a transmitter in semi-postpay service; and the rate relay 85 and associated circuit to control the dial 75.

As noted previously three modes of operation are possible by changing the position of several straps on the interface circuit as well as one strap included in the register.

Referring now to the operation of the above-described circuitry; the coin pulse generator produces pulses corresponding to the denomination of the coin deposited. That is to say one pulse is produced on deposit of a nickel, two pulses of the same duration with an off time between each pulse equivalent to the on time, is indicative of the deposit of a dime. And five pulses generated at a rate more than twice as fast as that utilized for nickels and dimes is indicative of the deposit of a quarter. The coin pulses produced by the coin pulse generator circuitry serve two purposes. Coin pulses key the coin tone oscillator 15 to provide an audible indication of the denomination and number of coins deposited. Coin tone recognition may be made at the central office by an operator or by machine. Coin pulses are also stored in the rate register which is programmed to control the amount of money required to complete a call.

Throughout much of the circuitry flipflop circuits or bi-stable multivibrators are employed. It should be noted that in the block symbology shown in the appended drawings each flipflop circuit is shown as having three inputs and two outputs. The upper of these three inputs is designated a "set" input, the lower input being a "reset" and the center or middle input being a "toggle" input. The toggle input is one at which a fall pulse will set the associated flipflop, and a second fall pulse will act to reset the flipflop at the same input. However, a rise pulse will not change the state of the flipflop. Each flipflop also includes two outputs the upper of which is designated as the "1" or true output, the lower being designated as the "0" or false output.

Referring again to the coin pulse generator operation clock circuit 38 which is essentially a conventional flip flop circuit, generates a square wave of either of two frequencies, as determined by the denomination of the deposited coin. Pulses from the clock circuit are applied to the toggle input of flipflop 31. The output of flipflop 31 is inhibited and will not produce output pulses until a coin has been deposited. When a coin is deposited one or more of the flipflops 32, 33 or 34 will turn on. This will start the coin pulse sequence by allowing flipflop 31 to transmit pulses to flipflop 32 and to the coin pulse output lead "D." At the same time ground is removed on the coin tone enable or "C" lead.

When a nickel is deposited positive potential is applied through contact 21A to the five cent lead. This presets the sequence divider so that one pulse will drive the associated circuit to a clear state. A dime at contacts 21B will preset the sequence divider for two pulses while a quarter at contacts 21C presets the sequence divider for five pulses and also operates the speed up circuit 39 which increases the frequency of the coin pulses.

When power is first applied to the circuit the clear lead CL extending from reset circuit 40 is grounded momentarily to preclear the dividers to prevent generation of coin pulses until all the sequence dividers reach their cleared state.

The clock circuit 38 consists of an astable multivibrator. When speed up circuit 39 is on the total period of the multivibrator is approximately 81 seconds. When the speed up circuitry is turned off the total period is reduced to 35 milliseconds. The output of the clock circuit 38 is fed to a frequency divider consisting of flipflop 31.

Speed up circuit 39 is formed of a bistable latch circuit of conventional design which is utilized to select which of the two frequencies the clock circuit will generate. The latch 39 is cleared at the end of the coin pulse sequence, this makes the clock operate at its longer period. Whenever a quarter is deposited the positive voltage pulse produced on the 25 cent lead at switch 21C turns on speed up circuit 39. At the completion of a coin pulse sequence the clock 38 again returns to its longer period.

Flipflop 31 is an inhibited frequency divider circuit. The circuit has two functions. It divides the frequency of the coin pulse multivibrator by two to produce a coin pulse with an exact 50 percent duty cycle and second it serves as a gate to turn on and off the pulses fed to the input of the sequence dividers. When no output is present from the output of gate circuit 22, the flipflop states operate alternately on the falling edge of pulses from the clock circuit 38. When an output is available, the output from flipflop 31 will be presented to the toggle input of flipflop 32.

The 5, 10 and 25 cent leads are connected to coin triggers 21A, 21B and 21C respectively. Whenever a coin is deposited the corresponding lead will receive a positive potential. This voltage will appear at associated gate circuits 22, 23 and 24, as shown in the drawing.

Three sequence dividers consisting of flipflops 32, 33 and 34 provide a pulse sequence of 1, 2 or 5 pulses when positive potential is applied to the 5, 10 and 25 cent leads respectively. Initially the sequence divider stages are in their cleared or off condition. When a nickel is deposited, flipflops 32, 33 and 34 are pulsed on. This places a ground on gates 37 and 36. Gate 36 turning off removes ground from the C lead. Gate 37 also turns off, to enable the frequency divider. On the next full pulse the clock 38 turns off letting the D lead go high and then low again. The internal stages of the clock circuit reverse, in turn turning off flipflop 31. Each succeeding flipflop circuit then turns off, returning the sequence dividers 32, 33, 34 to the clear stage. This then operates gate 35 which places ground on lead C and inhibits the frequency divider.

When a dime is deposited dividers 33 and 34 are pulsed on and gate 35 turns off. The frequency dividers start producing output pulses. After two pulses the sequence divider reaches the third state and turns on. When a quarter is deposited flipflops 32 and 33 turn on from the pulse, gate 35 turns off and speed up circuit 39 also turns off to shorten the period of the coin pulse multivibrator. The frequency divider produces five output pulses to the D lead and drives the sequence divider to the cleared state, returning the coin pulse multivibrator to its normal period.

As noted previously flipflops 51, 52, 53 and 56 and gate circuits 54 and 55 constitute the rate register circuit. This circuit counts and stores the total value of the coins deposited in the coin telephone. The reset or clearing circuit 40 resets the rate register circuits as well as the coin pulse circuits described above when power is first applied to the coin telephone circuit.

As noted previously the rate register contains three divider stages consisting of flipflops 51, 52 and 53, which provide a total capacity of 8 bits. Each divider is a flipflop of conventional design, operated in response to pulses of certain minimum duration so as to provide a high noise immunity.

Initially before any pulses are received all the dividers are in their cleared state, flipflops 51, 52 and 53 are off at their normal input making their upper or "1" outputs inoperative while the "0" outputs are in the operated or true condition. When a coin is deposited the coin pulse generator described above makes the D lead go low once for deposit of a nickel, twice for deposit of a dime and five times for a quarter. Each time the D lead goes low it will change the state of the first divider 51. The 10 cent divider will change state each time the output of flipflop 51 changes and the 25 cent divider 53 will change state each time the output of flipflop 52 changes. Thus these divider stages count and store the total value of money deposited. Gate 54 and inverter 55 form a NOR gate which controls the rate latch flipflop 56. As may be observed the inputs to gate 54 may be connected to the "0" outputs of flipflop 51, 52 and 53 or to the true outputs which are designated 5, 10 or 20 cent outputs. In the present embodiment gate 54 is shown as having two of its inputs connected to the "0" outputs of flipflops 51 and 53 respectively and the third input of gate 54 connected to the true or 10 cent output of flipflop 52. With the rate strap set for a 10 cent base rate as shown in the circuit the D lead must go low twice to provide the set conditions for the rate latch flipflop 56. To meet this set of conditions flipflop 51 must have a "0" output, flipflop 52 a "true" output and flipflop 53 a "0" output. This will cause an output from gate 54 which when inverted by inverter 55 will operate flipflop 56. When this circuit latches, it remains unchanged in the set condition regardless of deposit of additional coins.

By changing the strapping of the dividers 51, 52 and 53 any base rate desired in steps of 5 cents can be programmed up to a maximum of 35 cents. Should a base rate higher be desired additional divider stages may be added. The rate latch circuit 56 output controls, via lead G rate relay 85.

Of particular importance is the reset circuit 40 mentioned previously. This circuit provides a DC signal to insure that the coin pulse generator and rate register dividers 51, 52 and 53 described above and rate latch 56 are all in their cleared states when the phone first goes off hook. The circuit also insures that the other circuits are not cleared when a short break in the line occurs (less than 100 milliseconds) caused by opens during dialing, central office relay sequencing or an accidental hookswitch flash. Yet the circuit must provide a "clear" after 300 milliseconds to insure that a second call cannot be made by the user hanging up after his first call and then going offhook a second time and then placing a new call.

The clearing circuit 40 is a Schmidt trigger of conventional design sensing the positive potential of power supply 14. When a phone is first taken offhook at hookswitch contact 13 the power supply 14 starts to rise charging an internal filter. When the supply reaches a predetermined minimum value the reset circuit 40 will turn on making the CL lead go high. The time required for the power supply to reach this predetermined value allows other circuits to stabilize in their cleared state due to the "CL" lead being low. Whenever line current is interrupted the filter capacitors will start to discharge and thus the positive potential supply will start to fall. When the supply has fallen to a second predetermined value the reset circuit will turn off making the "CL" lead low to clear the other circuits.

In addition to the previously described circuits also included is the DC power supply circuit 14 which supplies the totalizer circuit with DC potential from the telephone line circuit. This same circuit also provides DC and audio signals to the central office and controls the transmission and signaling circuits of the telephone. Power supply 14 is of conventional design and consists of a diode bridge from which the positive and common potentials are derived as well as a center tap isolation terminal which is connected through an "X" strap to gate 81. The diode bridge is connected in series with the coin telephone circuit so line current of either polarity is converted to a positive polarity, regulated by an internal zener diode and filtered by included capacitors. Coin tones are generated by oscillator 15 and applied to the telephone line (conductor L2). Oscillator 15 is controlled by switch 16 which operates in response to the "D" lead going high.

When coin tones are being transmitted receiver 72 is muted by the C lead from inverter 36 going high turning on switch 73 which in turn acts to turn off receiver amplifier 74. This circuit also provides a high reverse direction loss which prevents signals generated by the receiver 72 from reaching the telephone line during semi-postpay service operation.

The rate relay circuitry included in the present telephone circuit is a multifunction circuit. Using only a single set of transfer contacts 85A, the dial 75, transmitter 72, and coin relay 95 are all controlled by rate relay 85. The rate relay in turn is controlled by two input leads Q and G. The Q lead provides control from the line current and polarity, being connected to power supply 14. The G lead provides control from the rate latch 56 of the rate register. Operation of the rate relay is different for the three modes of operation of the present coin telephone circuit.

For regular prepay service the rate relay 85 is controlled by the G lead and by coin battery voltages. When the phone goes offhook the G lead being high operates rate relay 85 shorting the dial at make contacts 85A and at the break contacts opening the coin relay circuit to ground. After coins totaling the initial rate are deposited the G lead extending from flipflop 56 goes low restoring the rate relay to move the shunt from dial and connect the coin relay to ground. In the event that is is desired to operate the coin relay before the rate has been reached the rate relay must be restored to complete the coin relay path.

This is accomplished by coin battery firing neon lamp 97 and applying voltage to the junction of diodes 91, 92 and 93. For a collect voltage diode 92 will conduct and cause the output of gate 82 to go low, putting current thru the lower winding of relay 85, and turning off gate 83, removing current thru the upper winding, thus restoring the rate relay 85. For a refund signal diode conducts turning on gate 82 which causes current to flow thru the lower winding and to turn off gate 83 to turn off removing current thru the upper winding thus restoring the rate relay 85. Also, the refund signal causes diode 93 to conduct putting current in the reverse direction thru the upper winding to restore the rate relay. Rate relay 85 being a bistable polarized relay operates with the polarity shown at either winding and releases when the polarity either winding is reversed.

Operation of rate relay 85 during emergency calling service is controlled by leads G, Q and CL and the coin battery voltages. When the phone is offhook and line current is flowing rate relay 85 is operated removing the coin relay 95 from ground. After the base rate has been reached the G lead will go low, however the rate relay 85 will remain operated by the Q lead being high. During the coin test period line current is interrupted and rate relay 85 will restore if the rate has been reached thus reflecting ground to the central office to signify that a rate has been reached. If the line current is off for more than 300 milliseconds the clear circuit will make the CL lead go low to to insure that gate 83 will not turn on to re-operate the rate relay when rate latch 56 clears and makes the G lead high. The rate relay will remain restored until line current is resumed. If the rate has not been reached when the line is open the rate relay will remain operated even after the "CL lead" goes low since the relay is bistable.

For semi-postpay service the operation of the rate relay 85 is as follows: when the phone goes offhook line polarity is normal causing the Q lead to be positive which turns on gate 81 turning off gate 82 in turn turning on gate 83 to operate rate relay 85 closing contacts 85A to enable transmitter 71 and dial 75. When a call is placed and the called party answers, reverse line current makes the Q lead negative restoring the rate relay to disable the transmitter 71 and the diode. When the base rate is reached the G lead goes high from rate latch 56, re-operating rate relay 85.

In the preceding the various circuits and sub-circuitry of the present pay station telephone have been described along with description of the form of operation normally encountered. A more thorough understanding of the present invention may be had by reference to the following in which the three different modes of operation of the present pay station telephone circuitry will be described along with the details of the various strapping arrangements utilized to achieve each separate and distinct mode of operation.

For standard prepay operation those straps designated in the drawings as "W" straps and those designated as "X" straps are included in the pay station circuitry. The "W" straps include a strap connecting the armature spring of contact 85A to the transmission network 60, another strap connecting transmitter 71 to dial contacts 75B and 75C, a strap between the break contact of rate relay springs 85A and coin relay 95 and a strap from neon lamp 97 to contacts 95B of the coin relay 95, and a strap from the upper terminal of the rate latch to the "G" lead. The above outlined strappings comprise the "W" strappings that are required for prepay operation. Additionally as noted previously "X" strapping is required and this includes the connection from the armature of spring contact 75A on dial 75 to the make spring that is included in spring combination 85A associated with relay 85.

Assuming the above wiring is present and the subscriber's telephone is therefore equipped for regular prepay operation, the following operations are involved in the placement of a call. When the user initiates a call he lifts the handset containing receiver 72 and transmitter 71 from the hookswitch that includes contacts 13 and 76. Dial tone may be returned immediately by the office or may be withheld until the initial rate (usually 10 cents) is deposited. In either case the user cannot dial his call until the initial rate deposit is made. The coins are inserted and passed through a chute to engage the appropriate trigger switches 21A, 21B or 21C each time a coin of corresponding value passes by.

In the prepay mode the rate relay 85 responds to presence of loop current as soon as the telephone goes offhook. The relay operates and opens a path from the coin relay 95 (at contact 85A) to the telephone network and also disables the dial by placing a shunt around dial 75. Closure of the coin relay contacts on deposit of the first coin has no affect on the loop unless that coin satisfies the initial rate for which the totalizer has been set. When the total of the deposit equals or exceeds the initial rate an output signal from the register flipflop 56 causes the rate relay 85 to release. Dial 75 now becomes operative while coin relay ground is extended at contact 85A to the transmission network 60, where it is connected to the telephone line and then to the central office.

Upon termination of a call the central office sends either a collect or refund battery to the coin telephone depending on whether the call was completed or abandoned or incomplete. If the call was completed coins are then directed into the cash compartment by operation of coin relay 95. On operator assistance calls the initial rate is refunded upon connection to the operator. Upon request by an operator to deposit additional coins oscillator 15 under control of switch 16 would produce brief tone pulses which are heard only by the toll operator indicating deposit of the appropriate amount of coins. Collection or return of coins is under control of the operator on toll calls.

The present coin telephone circuit may be converted to emergency calling service by removing the "X" strapping described above and substituting a "Y" strap which connects the power supply at an isolated potential location, to gate 81. The "W" strapping is retained and is identical to that outlined above. By virtue of the above strapping arrangement the dial is not disabled and the rate relay 85 does not restore immediately upon full deposit. When a call is initiated the central office briefly opens the loop at the appropriate time to check for proper deposit. If the initial rate has been deposited this interruption in loop current will cause rate relay 85 to restore immediately and re-operate. During its restored interval, ground is applied to the transmission network in the manner outlined above. It is again however removed when the rate relay re-operates. At the central office, coin relay ground is detected and permits the call to be completed. If the call is placed to an emergency or free number, the central office is programmed to complete the call even though no coin has been deposited. If no deposit or only a partial deposit has been made rate relay 85 does not restore. The central office does not detect a coin deposit and if the number dialed is not an emergency number the call is blocked. Absence of the coin relay ground connection for the duration of the call minimizes longitudinal current induced in the line from external sources and thereby reduces hum and noise during conversation. As coins are deposited tone pulses from oscillator 15 indicate to the operator the denominations of the coins deposited. Once the correct amount has been deposited the operator permits conversation to ensue.

For semi-postpay operation none of the above outlined strapping is included, only those straps designated "Z" are utilized. This includes a connection from the telephone line via power supply 14 to one of the "Q" inputs of gate 81 and a strap from the armature of spring combination 85A on rate relay 85 to receiver amplifier 74, transmission network 60, and dial springs 75B and another strap from the break spring of combination 85A to transmitter 71. The coin relay 95 is not used in semi-postpay operation.

For local calls (ones that require deposit of the initial rate only), the calling party initiates the call by lifting the handset from the hookswitch in the manner described above. Dial tone is extended by the central office and the user then dials his call in the conventional manner without depsiting any coins. If for any reason the call was not completed it is unnecessary for the coin telephone to refund coins because none has been deposited. If the call is answered the user can hear the called party but he is unable to converse because rate relay 95 at contacts 85A removes the handset transmitter 71 from the circuit when reverse battery answer supervision is forwarded to the pay station, until such time as the initial rate has been deposited. The user upon hearing the called party, inserts the correct amount of coins into the telephone actuating the coin switches 21A, 22B or 21C as appropriate. When these coins are deposited the totalizer counts the value of the coins until the initial rate has been deposited at which time the rate relay will operate and reconnect the user's transmitter into the circuit thereby allowing the calling and called parties to converse. When the call has been completed and both parties restore their handsets, the coin telephone restores to normal. Amplifier 74 isolates the receiver from the transmission network 60, preventing use of the receiver as a transmitter.

Some telephone systems provide a feature known as "Automatic Overtime Deposit," where after the initial time period of a call from a coin telephone the central office will collect the coins deposited, then test with a positive voltage connected relay to determine that an additional coin has been deposited; if the test verifies the deposit the call can continue for a second time period after which the coin is again collected.

When the present coin telephone is used in systems with this overtime deposit feature a diode 96 is connected ("V" wiring) across rate relay contacts 85A to provide a positive coin detection path through the coin relay.

While but a single embodiment of the present invention has been shown, obvious modification may be made without departing from the spirit and scope of the present invention, which is limited only by the claims appended hereto.

What is claimed is:

1. A coin operated telephone instrument adapted for connection to a telephone central office by means of a telephone line, including a transmitter, a receiver, and a calling device, the improvement comprising the inclusion of a totalizer circuit operated in response to deposit of coins in said telephone, to transmit tone signals representative of the value of said deposited coin via said line to said telephone central office, and further operated in response to deposit of at least one coin equivalent in total value, to a predetermined value to permit establishment of a circuit connection to a selected telephone station requiring the deposit of at least one coin in said coin operated telephone instrument; said totalizer comprising coin signal generating means operated in response to deposit of at least one coin and rate circuit means including first counting means connected to said coin signal generating means, electrically operated in response to said coin signal generating means, to permit establishment of said circuit connection to said selected telephone station.

2. A coin operated telephone instrument as claimed in claim 1 wherein: said receiver further includes a circuit connection to said coin signal generating means, said receiver muted in response to operation of said coin signal generating means during transmission of said tone signals to said central office.

3. A coin operated telephone instrument as claimed in claim 2 wherein: said receiver circuit connection to said coin signal generating means includes an amplifier connected to said receiver and switching means connected between said coin signal generating means and said amplifier, said switching means operated in response to said coin signal generating means to render said amplifier inoperative thereby muting said receiver.

4. A coin operated telephone instrument as claimed in claim 1 wherein: said coin signal generating means comprise a pulse source, second counting means connected to said pulse source conditioned in response to said pulse source, a plurality of coin operated switches each operated in response to deposit of a different denomination of coin in said telephone instrument to operate said conditioned second counting means, a tone source connected to said telephone line and switching means connected between said tone source and said second counting means, said switching means operated in response to said second counting means to operate said tone source thereby to transmit tones to said telephone central office.

5. A coin operated telephone instrument as claimed in claim 4 wherein: said coin signal generating means further include a speed-up circuit operated in response to deposit of at least one coin of a predetermined value to increase the rate of pulses generated by said pulse source, whereby the repetition rate of tones transmitted to said telephone central office is increased.

6. A coin operated telephone instrument as claimed in claim 4 wherein is further included: a reset circuit including circuit connections to said second counting means, operated in response to the receipt of line potential from said telephone central office, to reset said second counting means prior to deposit of at least one coin in said telephone instrument.

7. A coin operated telephone instrument as claimed in claim 1 wherein: said rate circuit means further include a rate relay; and latching means connected between said first counting means and said rate relay, said latching means operated in response to operation of said first counting means, to render said relay operated.

8. A coin operated telephone instrument as claimed in claim 7 wherein: there is further included reset means, connected to said first counting means, operated in response to line potential from said central office, to reset said first counting means prior to deposit of at least one coin in said telephone instrument.

9. A coin operated telephone instrument as claimed in claim 1 wherein: said rate circuit means are connected to said transmitter, said transmitter rendered operable in response to said rate circuit means after deposit of at least one coin equivalent in total value to said predetermined value thereby permitting establishment of a talking circuit connection to a selected telephone station on a semi-postpay operational basis.

10. A coin operated telephone instrument as claimed in claim 1 wherein: there is further included a coin relay including circuit connections to said rate circuit means; and in response to operation of said rate circuit means said calling device and said coin relay rendered operable, thereby permitting establishment of circuit connections to said selected telephone station after deposit of at least one coin equivalent in total value to a predetermined value, on a prepay operational basis.

11. A coin operated telephone instrument as claimed in claim 1 wherein there is further included: a coin relay connected to said rate circuit means; said rate circuit means conditioned for operation in response to deposit of at least one coin equivalent in total value to said predetermined value, and said conditioned rate circuit means operated in response to a reduction in voltage across said line to connect said coin relay to said telephone line to permit establishment of a circuit connection to a selected telephone station.

12. A coin operated telephone instrument as claimed in claim 7 wherein: said rate relay includes switching contacts connected to said telephone line; and a diode connected across said switching contacts to provide a coin detection path through said coin relay; whereby transmission of a polarized potential over said line from said telephone central office after a predetermined period of time can effect collection of deposited coins and determine the deposit of additional coins, whereby a phone conversation may be extended beyond an initial predetermined period.

13. A operated telephone instrument as claimed in claim 7 wherein: said telephone instrument is adapted for semi-postpay operation, by the inclusion of a first circuit connection between a first side of said telephone line and said rate relay; a second circuit connection between said rate relay extending to said receiver and to a second side of said telephone line, a third circuit connection between said rate relay and said transmitter and a fourth circuit connection between said latching means and said rate relay.

14. A coin operated telephone instrument as claimed in claim 7, wherein; there is further included a coin relay connected to said rate relay; said coin relay connected to said telephone line in response to operation of said rate relay to a first operational state.

15. A coin operated telephone instrument as claimed in claim 14 adapted for prepay operation by the further inclusion of a circuit connection between said rate relay said said calling device, said calling device conditioned for operation in response to operation of said rate relay.

16. A coin operated telephone instrument as claimed in claim 14, adapted for emergency calling operation by the further inclusion of a circuit connection between said telephone line and said rate relay, said rate relay operated in response to a reduction in voltage across said telephone line, to a second operational state to disconnect said coin relay from said telephone line.

* * * * *

UNITED STATES PATENT OFFICE
CERTIFICATE OF CORRECTION

Patent No. 3,760,101 Dated September 18, 1973

Inventor(s) ROBERT V. BURNS

It is certified that error appears in the above-identified patent and that said Letters Patent are hereby corrected as shown below:

Column 12, Line 38, after "A" add -- coin

Column 12, Line 56, after "relay" omit first "said" and insert -- and --.

Signed and sealed this 19th day of February 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.